United States Patent [19]

Culley et al.

[11] Patent Number: 5,101,497
[45] Date of Patent: Mar. 31, 1992

[54] PROGRAMMABLE INTERRUPT CONTROLLER

[75] Inventors: Paul R. Culley, Cypress; Montgomery McGraw, Spring; Karl N. Walker, Hockley; Lazaro D. Perez, Houston, all of Tex.

[73] Assignee: Compaq Computer Corporation, Houston, Tex.

[21] Appl. No.: 691,169

[22] Filed: Apr. 24, 1991

Related U.S. Application Data

[63] Continuation of Ser. No. 242,954, Sep. 9, 1988, abandoned.

[51] Int. Cl.$^5$ .............................................. G06F 9/46
[52] U.S. Cl. ................................................. 395/725
[58] Field of Search ............................... 364/200, 900

[56] References Cited

U.S. PATENT DOCUMENTS

| | | | |
|---|---|---|---|
| 4,441,154 | 4/1984 | McDonough et al. | 364/200 |
| 4,628,449 | 12/1986 | Zardiackas | 364/200 |
| 4,630,041 | 12/1986 | Casamatta et al. | 364/200 |
| 4,631,670 | 12/1986 | Bradley et al. | |
| 4,760,516 | 7/1988 | Zwick | 364/200 |
| 4,768,148 | 8/1988 | Konopik et al. | 364/200 |
| 4,890,219 | 12/1989 | Heath et al. | 364/200 |

FOREIGN PATENT DOCUMENTS 0192944 3/1986 European Pat. Off.
2202658A 9/1988 United Kingdom.

OTHER PUBLICATIONS

IBM Technical Disclosure Bull., vol. 28 No. 11, Apr. 1986, pp. 4971–4972, "Hardware Interrupt Vectoring Circuit For Non-Compatible Peripheral".
Manual Excerpt: "8259A/8259A-2/8259A-8 Programmable Interrupt Controller", Microsystems Components Handbook, vol. 1, 1984, Intel Corp. pp. 2-120-2-127.
IBM Technical Disclosure Bulletin, vol. 29, No. 6, No. 6, Nov. 1986, pp. 2380–2381, "Interrupt Sharing For Personal Computer".
IBM Technical Disclosure Bulletin, vol. 25, No. 9, pp. 4651–4655, G. Davis, "Signature Analysis Testing of the Interrupt Controller" . . . .
Intel Corp., Microprocessor and Peripheral Handbook, vol. 1, pp. 2-271 to 2-314, 1987.
IBM Corp. Personal System/2 Model 80 Technical Reference, First Ed., Apr. 1987, pp. 2-63 to 2-65.

*Primary Examiner*—Michael R. Fleming
*Assistant Examiner*—Ayaz R. Sheikh
*Attorney, Agent, or Firm*—Pravel, Gambrell, Hewitt, Kimball & Krieger

[57] ABSTRACT

A computer system including a programmable interrupt controller wherein individual interrupt levels can be programmed to receive edge or level sensed interrupt signals. The controller includes a programmable register for storing the interrupt level designations for each interrupt level and associated interrupt recognition logic.

8 Claims, 3 Drawing Sheets

PROGRAMMABLE INTERRUPT CONTROLLER

This is a continuation of co-pending application Ser. No. 242,954 filed on Sept. 9, 1988, abandoned.

BACKGROUND OF THE INVENTION

This invention relates generally to computer systems. In particular this invention relates to microcomputer systems including one or more peripheral input/output devices such as printers, modems, disc controllers, keyboards, etc. One method of servicing such requests is to program the central processor to periodically poll the various peripherals to determine whether any require service by the central processor. Alternatively, and of particular concern to the present invention are systems which utilize an interrupt signal provided by the peripheral device to request servicing by a central source such as a microprocessor, thereby avoiding the regular polling of the devices by the central processor.

In such interrupt driven systems, the peripheral devices execute certain tasks independently of the central source or microprocessor, but require communication with the microprocessor at irregular, random and therefore asynchronous intervals. In such systems the particular peripheral device or subsystem generates an interrupt signal which is passed on to the central processing unit or microprocessor via a dedicated interrupt line or channel to request that the central processing unit interrupt its processing and communicate with the peripheral device or subsystem. Upon detecting an active interrupt request the central processor transfers control to service the particular request.

In typical interrupt driven systems, a processor services many peripheral devices over a single input/output channel which can only be utilized by one peripheral at a time. Consequently, the operator will want to assign priorities to the various peripheral devices to discriminate between concurrent interrupt requests to service the most urgent before the others. Conventional systems have dealt with the problem of multiple interrupt sources by providing an interface circuit between the central processor and the peripherals to centrally sort, prioritize and control the interrupt sequencing. One such circuit is the 8259 series programmable interrupt controller manufactured by the Intel Corporation and described in the publication "Microprocessor and Peripheral Handbook": Vol. 1, pp. 2-271 through 2-314 (Intel Corporation 1987). This manual is incorporated herein by reference.

The typical interrupt controller handles interrupt requests from eight or more peripherals or subsystems. Each interrupt source is provided an interrupt service routine at a specified vectoral address for servicing the interrupt request. Each interrupt source has its own interrupt request line, and programmable controllers such as the Intel 8259 allow for identification and prioritizing the various sources on system initialization. In typical operation, the interrupt controller recognizes interrupt requests and passes the highest priority request to the central processor, holding lower priority requests until the processor has completed servicing the interrupt in progress.

Of particular importance to the present invention are the conventions adopted in the industry concerning the physical parameters of interrupt signals originating in the interrupt sources and which are transmitted to the interrupt controller. Interrupt sources utilized currently generate one of two types of interrupt signals. The first is known as edge triggered and consists of a pulse signal transitioning from a logic low level voltage to a logic high level. Alternatively, some interrupt sources provide a level interrupt request signal as distinguished from an edge sensed signal transitioning from low to high. Level sensing facilitates interrupt level sharing by more than one interrupt source and is the mode of choice for fully loaded systems to permit multiple interrupt sources such as serial ports to share a single interrupt line. Because of the variance between conventions, it has become important for the interrupt controller to be able to recognize either type of interrupt signal.

To accommodate this, interrupt controllers like the 8259A from Intel Corporation have been designed to allow the user to designate upon initialization of the system which interrupt convention is to be sensed. FIG. 1 is a block diagram of the typical prior art controller such as the Intel 8259A. FIG. 2 is a schematic illustration of the simplified logic circuit of the 8259A relating to interrupt recognition. During initialization the 8259A interrupt controller in response to user designation issues one of two command words which set the controller to recognize edge sensed interrupts or disables the edge sense logic to permit interrupts to be recognized by the controller upon receipt of a level high interrupt request (FIG. 1).

While this feature has advantages over prior systems, it does not permit the user to program each of the interrupt lines independently, to provide interrupt control for a computer system wherein some interrupt sources generate edge sensed signals and others generate level interrupt signals. In situations where a system includes more interrupt sources than it has available interrupt lines to the interrupt controller, or where it is desirable to place more than one source on an interrupt line of a particular priority level, some form of level sharing is highly desirable. To share interrupt lines it is necessary to connect more than one interrupt source in parallel to an interrupt request line. Edge sensed interrupt devices typically produce the low to high transition signal by taking the output terminal connected to the interrupt request line to ground until an interrupt is desired and then release it to go high. Consequently, it is very difficult to accommodate multiple parallel sources on the same line since the output will not transition to the high level if any of the parallel sources are concurrently holding the output to ground level. Prior systems such as that disclosed in U.S. Pat. No. 4,631,670 have attempted to resolve this problem by utilizing complex and expensive additional circuitry.

In contrast, level sensed interrupt devices can easily be placed in parallel since a resistor pulls the line high when no interrupt is required and the device takes the output terminal low and holds it until serviced. The ability to provide one or more interrupt lines on an interrupt controller which are level sensed, while keeping the others edged sensed greatly facilitates the assembly of varied interrupt devices and the sharing of interrupt lines by more than one peripheral without involving complex an costly additional circuitry.

SUMMARY OF THE INVENTION

In contrast to prior systems of interrupt control, the present invention provides an interrupt controller including a means for programming individual interrupt lines to recognize particular modes or conventions of interrupt signals. Briefly stated, the present invention provides a computer system with interrupt control wherein various interrupt sources can be attached to individually programmed interrupt lines so that the user is able to assemble the system without being required to maintain uniformity of interrupt convention among the various peripheral or subsystems. The system of the present invention includes an interrupt line interface logic circuit to recognize either mode of interrupt signal and a readable, writable register to receive programmed instructions to individually define the interrupt mode of each interrupt line on he controller.

DESCRIPTION OF THE PREFERRED EMBODIMENT

The following disclosures are hereby incorporated by reference:

U.S. application Ser. No. 07/243,327, entitled "Multiple Word Size Computer Interface with Master Capabilities" by Paul R. Culley, filed on Sept. 9, 1988;

U.S. application Ser. No. 07/243,480, entitled "Computer System with High Speed Data Transfer Capabilities" by Paul R. Culley, filed on Sept. 9, 1988;

U.S. application Ser. No. 07/242,728, which is now a U.S. Pat. No. 4,999,805, entitled "Extended Input/Output Circuit Board Addressing System" by Paul R. Culley and Montgomery McGraw, filed on Sept. 9, 1988; and U.S. application Ser. No. 07/242,734, entitled "Method and Apparatus for Configuration of Computer System and Circuit Boards" by Curtis R. Jones, Jr., Robert S. Gready, Roberta A. Walton and Scott C. Farrand, filed on Sept. 9, 1988, all of which are assigned to the assignee of this invention.

Figure 1:
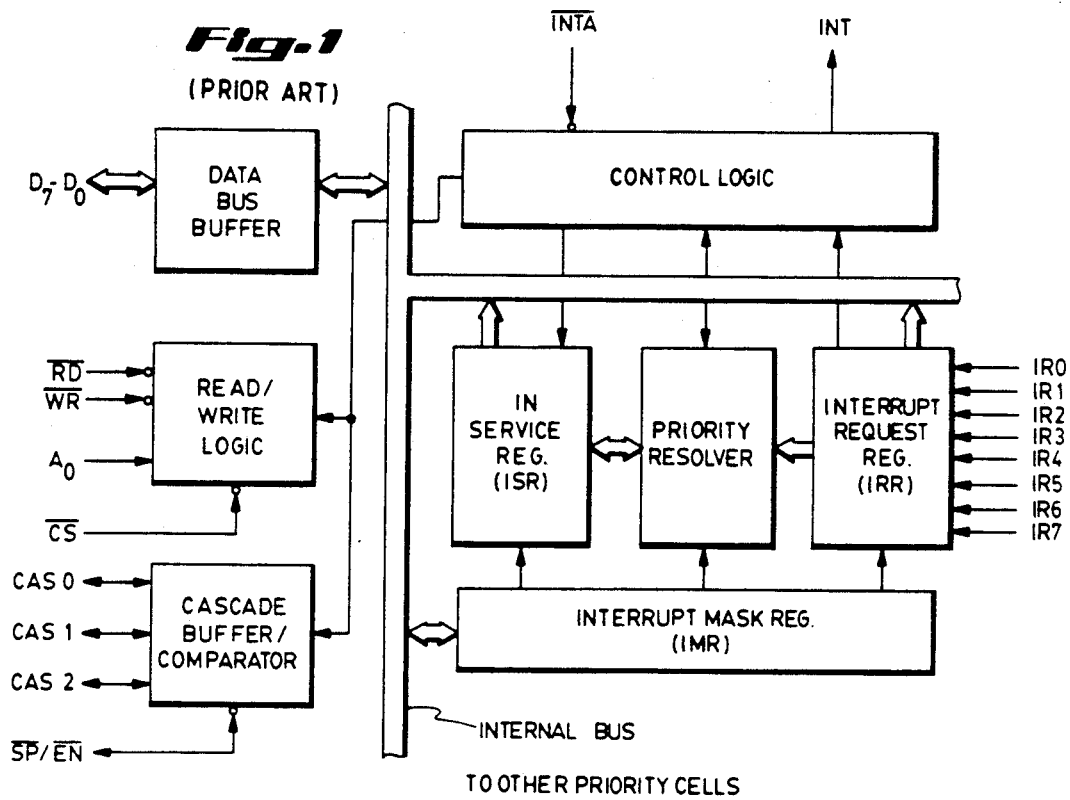
FIG. 1 is a block diagram of the typical prior art interrupt controller.
Figure 2:
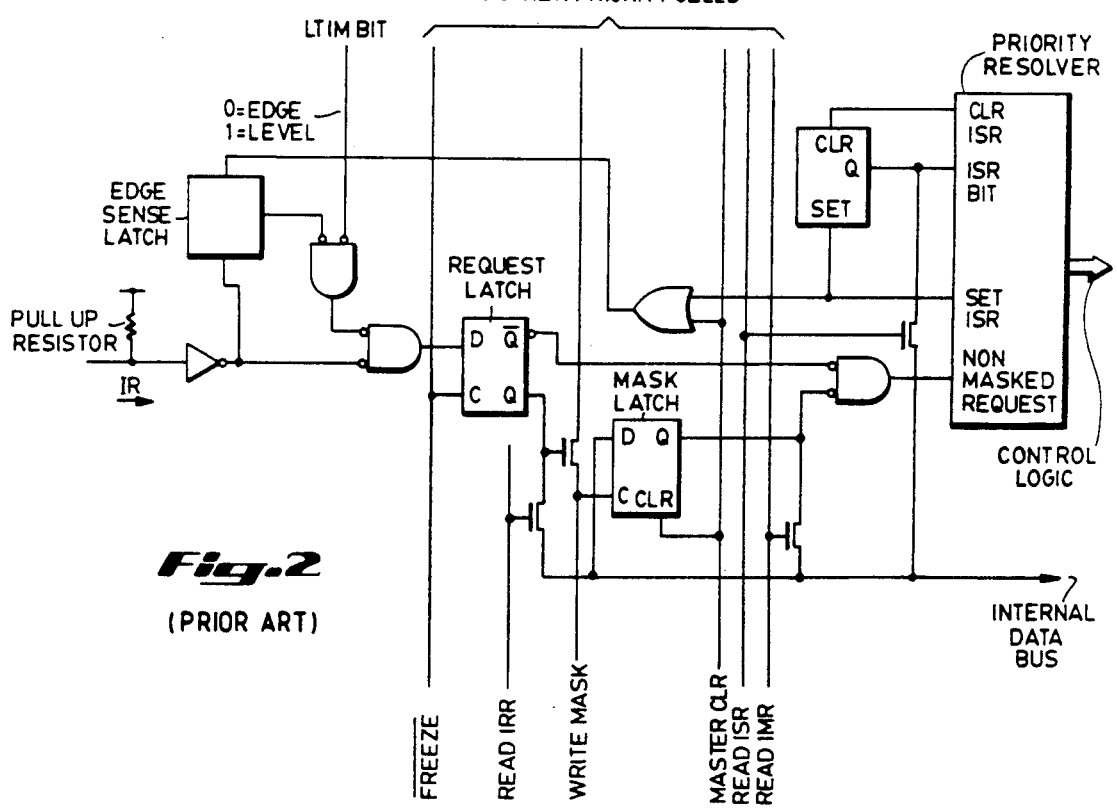
FIG. 2 is a schematic diagram of the simplified logic circuit of the prior art interrupt controller.
Figure 3:
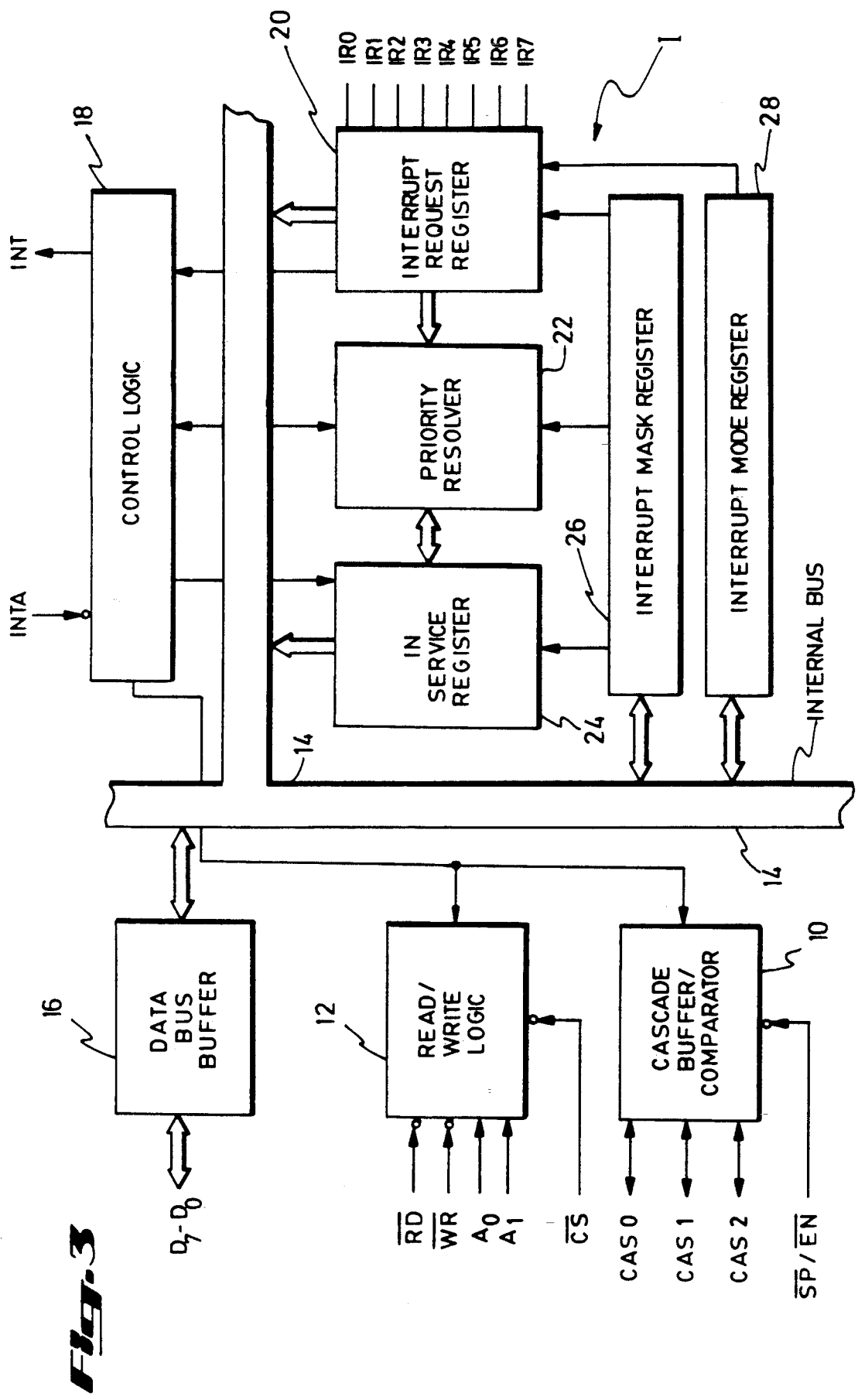
FIG. 3 is a schematic diagram of the interrupt interface system of the present invention.

Referring now to the drawings, FIG. 3 is a schematic block diagram of a portion of the computer system according to he invention. In particular, FIG. 3 is a schematic diagram of the interrupt controller circuit according to the present invention. In the drawings the letter I designates generally the interrupt controller circuit. Interrupt controller I interfaces between a central processor (not shown) and one or more peripheral devices (not shown) which generate interrupt signals to indicate a need for servicing by the processor. The interrupt controller I is attached to the central processor as an input/output peripheral. The user is able to program various parameters of the controller such as the priority levels, interrupt signal mode, etc. to suit the particular needs of the system.

Interrupt request signals from the peripheral devices are received on interrupt request lines $IR_0$–$IR_7$. It should be understood that while the interface controller of FIG. 3 is configured to receive interrupts from eight sources, multiple interrupt controllers can be cascaded to operate in a master/slave relationship via cascade buffer/comparator 10 in the same manner as the prior art 8259A Intel controller. A single interrupt controller circuit is shown and described herein in the interest of clarity.

Interrupt controller I connects to the processor as follows. The $\overline{CS}$ pin is a chip select input which when enabled (low) enables the read ($\overline{RD}$) and write ($\overline{WR}$) logic 12 permitting communication between, the interrupt controller I and the processor via the bidirectional internal bus 14, the data bus buffer circuit 16 and the bidirectional system data bus ($D_7$–$D_0$). The data bus buffer 16 isolates the controller circuit from the system data bus unless enabled, whereupon data is transmitted via buffer 16 to the processor via the bidirectional system data bus connected to terminals $D_7$–$D_0$.

The write ($\overline{WR}$) input to logic circuit 12, when enabled, permits the controller I to accept programming instructions from the processor. These instructions will include operating command words which set various parameters for operation of the controller I. Enabling the read ($\overline{RD}$) input of logic circuit 12 permits the processor to obtain data indicative of the status of controller I, including the status of the parameters set in the initialization sequence. The $A_0$ and $A_1$ address lines work in conjunction with the $\overline{WR}$, $\overline{CS}$ and $\overline{RD}$ lines of logic circuit 12 to decode various command words from the processor and the status requests from the processor. These address pins are typically connected to corresponding address lines of the processor.

Data bus/buffer 16 is a bidirectional bus which permits transfer of control, status and interrupt address data between the controller I and the processor. Interrupt address data includes vectored pointers which identify the address in processor readable memory where the interrupt service routines for the particular peripheral devices are stored.

Control logic circuit 18 is the logic circuit which controls the transmittal of interrupt requests to the processor via the interrupt line (INT) and receives interrupt acknowledge signals from the processor via the interrupt acknowledge line ($\overline{INTA}$).

In operation, when a valid interrupt request is asserted by a peripheral device, controller I causes an interrupt signal to be placed on output pin INT which is typically connected to the processor's interrupt input terminal. After receipt of an interrupt request via the INT line, the processor generates an interrupt acknowledge signal which is passed to controller circuit I via the $\overline{INTA}$ line. An enabling signal on the $\overline{INTA}$ line in conjunction with enabling signal to logic circuit 12 causes the controller circuit 18 to write the vectored address of the appropriate interrupt service routine to the data bus via buffer 16.

Interrupt requests from the various peripherals are received via request lines $IR_0$–$IR_7$. These are asynchronous requests. In the present invention each of the request lines $IR_0$–$IR_7$ may be programmed initially on power up and changed during program execution to recognize either an edge sensed interrupt signal or a level sensed signal. An edge sensed interrupt is executed by raising the voltage on an interrupt request line ($IR_0$–$IR_7$) from a low state to logic high state and holding it high until acknowledged. A level sensed interrupt is executed by a low level signal on the request line.

Receipt, prioritizing and servicing interrupt requests are accomplished via the various registers contained within controller I. Interrupt request register 20 receives and stores the identity of any interrupt level or line $IR_0$–$IR_7$ which is requesting an interrupt. Interrupt Request Register 20 is connected in cascade fashion to Priority Resolver 22. Priority Resolver 22 is a logic circuit which compares the priority levels (programmed by the user) of the interrupt lines or levels requesting service to those in service, latching the lower priority requests in a standby mode and directing servicing of the highest priority level. The outputs of the Priority Resolver 22 are connected to the In-Service Register 24. In-Service Register 24 stores the identification of any request line that is being serviced by the microprocessor. The details of interactive connection and internal logic relating to these registers a matter well known in the art and consequently is not repeated herein.

Where the user desires to prevent one or more interrupt lines from being serviced either temporarily or on a more prolonged basis, a mask bit is set corresponding to that interrupt line. These mask bits are stored in Interrupt Mask Register 26. Interrupt Mask Register 26 operates to disable one or more Interrupt Request lines in Interrupt Request Register 20. Interrupt Mask Register 26 is a readable/writable register in bidirectional communication with the processor via internal bus 14 and data bus buffer 16.

Interrupt mode register 28 is readable/writable by the processor and control logic 18 via internal bus 14 and data bus buffer 16. Interrupt mode register 28 stores a number of bits containing the interrupt mode designation for each of the interrupt lines $IR_0$–$IR_7$. In the preferred embodiment, a logic zero level indicates edge sensed mode and a logic one indicates level sensed mode. The default condition is zero or edge sensed. Address pin $A_1$ is utilized by the processor to initialize the interrupt mode register during the system initialization sequence described below.

On power up, the processor initializes interrupt controller 1 by issuing a command wherein $A_0$ and $A_1$ are zero and $D_4$ is set to one. Interrupt controller 1 recognizes this command and in response thereto initiates an automatic sequence of operations on the various registers of the controller 1 utilizing data obtained via bus/buffer 16. In this sequence, controller 1: clears the interrupt mask register so that no interrupts are masked; assigns the lowest priority to $IR_7$; sets the slave mode address ($CAS_0$, $CAS_1$, $CAS_2$) to seven (111) indicating a single controller is being utilized; clears the special mask mode bit (no special masks); and sets the Status Read bit to IRR (prepared to read interrupt requests).

The first and second initialization command words set the address format for locating interrupt service routines to be compatible with the particular processor being utilized, by inserting appropriate spacing bits on groups of address lines $A_0$–$A_{15}$ with the rest of the address (2 bytes long) being provided in accordance with the user's program specifications. These first and second command words also cause the controller 1 to determine whether a single controller or multiple cascaded/controllers are to be utilized by reading a designated bit in the command word. If multiple controllers are to be utilized, subsequent initialization steps are executed in command word three. If multiple controllers are to be utilized in a master/slave relationship, command word three sets the slave register 10 to identify the particular controller as slave or master and set the logic gates for appropriate interaction to transmit interrupt, priority and mask data from slave to master.

Following this sequence, if the initialization command word four is set to zero (indicating no further preconditioning is necessary) the initialization sequence is completed. If the initialization command word four is not zero, it indicates that the controller is to be operated in a fully nested mode. If the fully nested mode is specified, the controller will initialize the cascade buffer/comparator 10 in the same fashion as prior art controllers described in the incorporated reference.

Following the automatic execution of the initialization command words, certain other commands from the processor permit further initialization or status changes while operating. These commands are designated operational commands. The first operational command word ($OCW_1$) consists of a one on $A_0$, a zero on $A_1$ and eight bits on data bus $D_0$–$D_7$ which specify which of the eight interrupt lines $IR_0$–$IR_7$ are to be masked. A one (1) on line $D_7$ masks $IR_7$. A zero (0) on line $D_7$ enables $IR_7$.

Operational command word two initializes the priority resolver and control logic relating to the type of end of interrupt signal desired, the type of rotating priority sequencing desired and other options as described in the incorporated reference. This command word two operates in the same fashion as the prior art Intel 8259A controller. Operational Control Word Three initializes the special mask mode to permit programs executing in the processing to temporarily mask specified interrupts. This word functions in the present controller in the same fashion as described in the incorporated reference.

In addition to operational control words one, two and three, in the controller of the present invention an additional operational command word four is specified which permits the user to individually program each interrupt request line to specify the interrupt mode (either edge or level sensed) which will be recognized. Operational command word four is recognized when $A_0$ and $A_1$ are both set to one. The controller then reads $D_0$–$D_7$ to set the interrupt modes for $IR_0$–$IR_7$ in the corresponding eight bit interrupt mode register 28. Edge sensed is set by placing a zero value in the register and level sensed is set by placing a value of one in the respective register positions. These mode values are utilized in the interrupt recognition logic pertaining to each interrupt line as described below.

Figure 4:
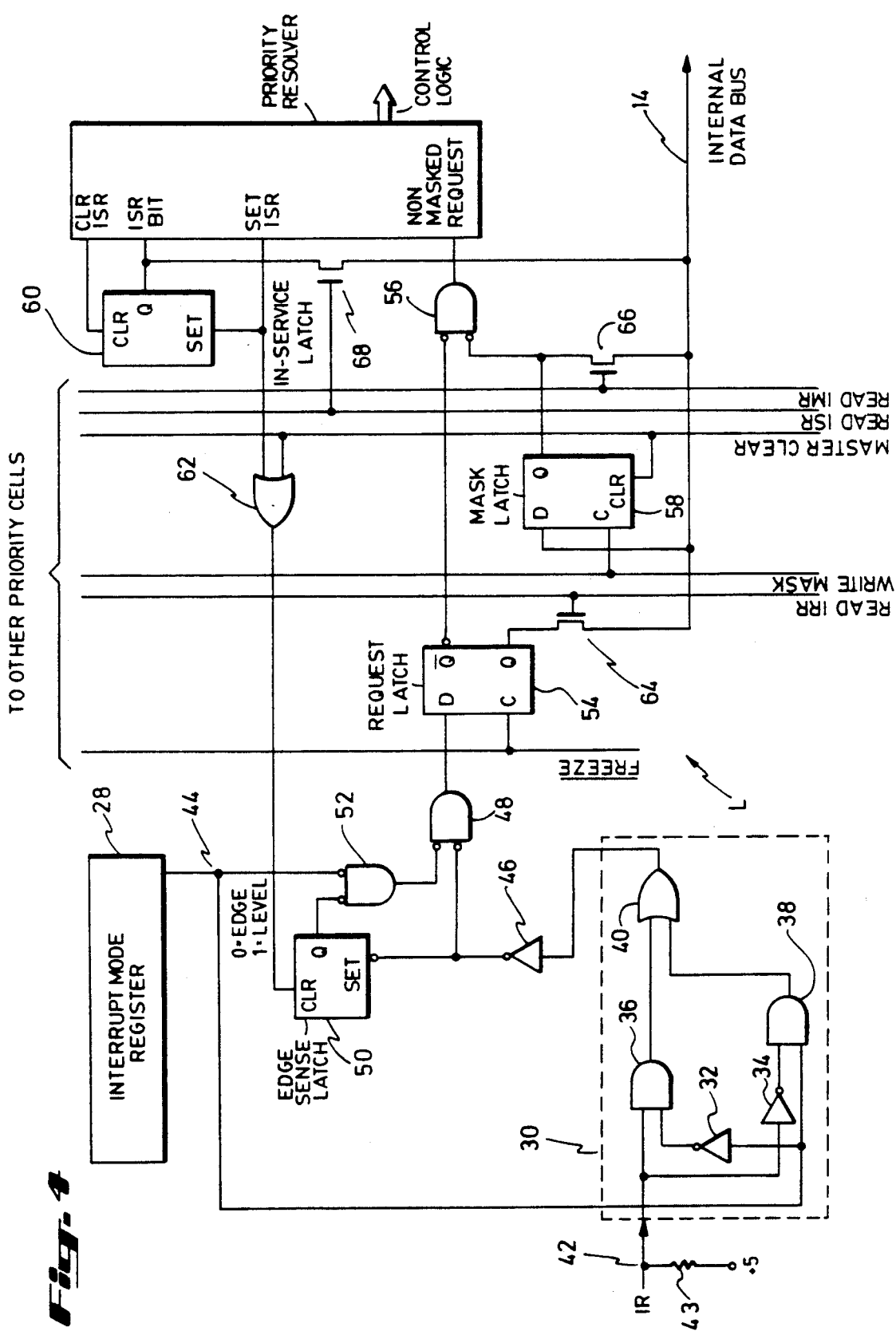
FIG. 4 is a schematic diagram of the logic circuit for the interrupt controller of the present invention.

FIG. 4 illustrates the simplified logic circuit L for recognition of interrupt requests. It should be understood that Circuit L essentially represents one logic cell of Interrupt Request Register 20 which is duplicated in register 20 for each interrupt request line $IR_0$–$IR_7$. For the sake of clarity the operation of circuit L will be described as it pertains to a single interrupt request line with the understanding that one of ordinary skill in the art could add the requisite number of duplicate circuit elements to service the required number of interrupt request lines.

Turning now to the details of circuit L, each interrupt line $IR_0$–$IR_7$ connects to an interrupt logic interface circuit 30. Circuit 30 includes inverters 32 and 34, AND gates 36 and 38, and OR gate 40. Alternately, circuit 30 could be an XOR gate, instead of the inverters, AND gates and OR gate. Interrupt request signals on lines $IR_0$–$IR_7$ will either be positive edge sensed or low level sensed. Circuit 30 will provide a logic high output at OR GATE 40 in response to either type of input.

An edge sensed signal at interrupt request line 42, which line is pulled high by a resistor 43, will be inverted by inverter 34 to provide a logic low signal at a first terminal of AND gate 38 and will provide a logic high signal at the first terminal of AND gate 36. If interrupt request line 42 is programmed to be edged sensed, a logic low or zero will be placed on line 44 from interrupt mode register 28, thereby disabling AND gate 38 and satisfying the AND condition of AND gate 36 via inverter 32 and producing a logic high level output to OR gate 40 and consequently a logic high signal to inverter 46. A logic low or zero is therefore provided to a first terminal of NOR gate 48 and to the set pin of edge sense latch 50. In response to the low at its set pin, the Q output of latch 50 goes high, providing this output to a first terminal of NOR gate 52. This produces a second low signal at the second terminal of NOR gate 48 and a logic high at the output of NOR gate 48 which is connected to the D pin of transparent D type Request Latch 54.

Request Latch 54 is one latch in the Interrupt Request Register 20. The logic high at D on latch 54 produces a logic low at the $\overline{Q}$ output which satisfies half of the input condition for NOR gate 56. The second input condition is satisfied unless the interrupt has been masked (disabled) via Mask Latch 58. Mask latch 58 is a D type latch which forms part of Interrupt Mask Register 26. This latch masks the interrupt when a logic high voltage is presented at its D input from internal data bus 14 causing Q to go high to disable NOR gate 56. The interrupt request is then passed to the priority resolver 22 for transmittal to the control logic after resolving conflicts. When the interrupt request is passed to the control logic, its INT output is enabled thereby communicating the interrupt request to the processor. When the interrupt request is acknowledged by the processor via an interrupt acknowledge signal (INTA), the in-service bit is set, which sets In-Service Latch 60. This signal also enables OR gate 62 which clears Edge Sense Latch 50 to reinitialize the circuit L to receive the next interrupt.

Switches 64, 66 and 68 are transistor switches which are normally open and only enabled to perform the Read IRR, Read IMR and Read ISR functions, respectively, to transfer status of those registers to internal data bus 14 for transmittal to the processor.

In a level sensed mode, a level low voltage interrupt signal is presented on IR line 42. This signal is inverted by inverter 34 satisfying half of the input enabling requirement for AND gate 38. In level sensed mode, a logic high is present on line 44 from interrupt mode register 28, thereby satisfying the second enabling condition for AND gate 38 and disabling the edge sense AND gate 36 via inverter 32. On enablement AND gate 38 provides an enabling high voltage to OR gate 40, which provides a logic high output to inverter 46. This input to inverter 46 provides an enabling low signal to one input of NOR gate 48. The other enabling condition for NOR gate 48 is always satisfied in level sensed mode by the logic high signal from line 44 to NOR gate 52. Once NOR gate 48 is enabled, the interrupt is processed as described above. When the interrupt is serviced, the ISR bit is attempted to be cleared. The interrupt signal from the peripheral is cleared by the processor as one step in the interrupt service routine. The in-service bit is cleared by controller 1 when the processor issues an End of Interrupt signal after terminating the interrupt signal from the peripheral device and before leaving the interrupt service routine to prevent a false second interrupt from occurring. If a second peripheral sharing the interrupt is requesting service by holding the IR line low, the processor receives a true second interrupt after exiting the interrupt service routine because the request is still pending so the interrupt is still active to the processor. Thus the processor performs back to back service on co-pending, shared interrupts. If a second peripheral was not requesting service, the IR line would be high because of the pull up resistor 43 and the in-service bit would be cleared.

Thus, it is clear that the interrupt controller of the present invention provides a computer system wherein peripherals with either level sensed or edge sensed interrupt signals can be assembled to a common interrupt controller. The controller of the present invention thereby provides enhanced flexibility and facilitates level sharing by permitting level sensed interrupts to share a single interrupt line without complex and costly additional circuitry.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. In a computer system including a processor and a plurality of peripheral devices connected to the processor for servicing in response to interrupt signals generated by the peripheral device, programmable interrupt controller interface connected between the processor and the peripheral device, said interrupt controller comprising:

means for receiving and storing a plurality of interrupt request signals from said peripheral devices, said receiving means including a plurality of interrupt request input terminals;

means for assigning priorities to each of the interrupt request signals received;

means for resolving and selecting the highest priority interrupt request signal among concurrent interrupt request signals, said priority resolving and selecting means including means for placing lower priority interrupt requests in a stand-by mode;

means for transmitting the selected interrupt request to said processor;

means for transmitting data concerning the peripheral device initiating the selected interrupt request to the processor; and programmable means for programming said controller to recognize one of a plurality of interrupt request signal modes as valid, said programmable means including means to allow said processor to read and write data designating the mode of interrupt request signal to be considered valid as to each of said interrupt request input terminals on an individual basis.

2. The computer system of claim 1, wherein said programmable means comprises:

register means for storing data indicative of the mode of interrupt request signal to be recognized as valid for each peripheral device;

logic circuit means for interfacing between said peripheral devices and said interrupt request receiving means, said logic means being adapted to provide an output signal having a common mode upon the receipt of an interrupt request formatted in any one of the valid modes.

3. The computer system of claim 2, wherein said programmable means includes means for individually designating as to each peripheral device edge sensed or level sensed mode interrupt requests signals as valid.

4. The computer system of claim 3, wherein valid level sensed interrupt request signals comprise a level logic low voltage signal.

5. The computer system of claim 3 wherein valid edge sensed interrupt request signals comprise a signal transitioning from a logic low level to a logic high level.

6. The computer system of claim 3 wherein said logic circuit means comprises:
   an interrupt request signal input line for each peripheral device;
   a first logic circuit connected to said interrupt input line;
   a second logic circuit connected to said interrupt input line;
   said first logic circuit comprising a first AND gate having a first and second input terminal and an output terminal, said first input terminal being connected to said interrupt request input line;
   a first inverter means for inverting the data signal from said register means, said first inverter means being connected between said register means and said second input of said first AND gate;
   said second logic circuit comprising:
      a second AND gate having a first and second input terminal and an output terminal, said first input terminal being connected to said register means,
      a second inverter means for inverting the interrupt request signal, said second inverter means being connected between said interrupt request input terminal and said second input of said second AND gate; and
      an OR gate having first and second input terminals and an output terminal; said first and second input terminals being connected to said output terminals of said first and second AND gates.

7. The computer system of claim 1, wherein said controller further comprises:
   means for selectively disabling the selecting of interrupt request signals from one or more of said peripheral devices.

8. The computer system of claim 1 wherein said controller further comprises:
   means for interconnecting two or more of said controllers, said interconnecting means including means for designating one of said interconnected controllers as a master and the other of said interconnected controllers as slaves, said master controller interfacing directly with the processor, said slave controllers receiving interrupt requests which are prioritized, selected and passed to said master controller for further prioritization before being transmitted to said processor.

* * * * *